United States Patent
Markus

(10) Patent No.: US 7,127,954 B2
(45) Date of Patent: Oct. 31, 2006

(54) METHOD AND DEVICE FOR MEASURING THE FLOW RATE OF A FLUID

(75) Inventor: Zimmermann Markus, Corbeil Essonnes (FR)

(73) Assignee: Altis Semiconductor, Corbeil Essonnes (FR)

( * ) Notice: Subject to any disclaimer, the term of this patent is extended or adjusted under 35 U.S.C. 154(b) by 101 days.

(21) Appl. No.: 11/101,152

(22) Filed: Apr. 7, 2005

(65) Prior Publication Data
US 2005/0223793 A1    Oct. 13, 2005

(30) Foreign Application Priority Data
Apr. 8, 2004  (FR) .................................. 04 50711

(51) Int. Cl.
*G01F 1/708* (2006.01)

(52) U.S. Cl. .................................. 73/861.95

(58) Field of Classification Search ............. 73/861.95, 73/202.5; 60/655; 62/325
See application file for complete search history.

(56) References Cited

U.S. PATENT DOCUMENTS

| | | | |
|---|---|---|---|
| 4,237,730 A | 12/1980 | Feng | 73/204 |
| 4,272,963 A * | 6/1981 | Lay | 60/655 |
| 4,548,075 A * | 10/1985 | Mariano | 73/202.5 |
| 5,386,704 A * | 2/1995 | Benedict | 62/325 |

FOREIGN PATENT DOCUMENTS

EP    0289361    4/1988    ...................... 5/14

* cited by examiner

*Primary Examiner*—Edward Lefkowitz
*Assistant Examiner*—Jewel V. Thompson
(74) *Attorney, Agent, or Firm*—Sofer & Haroun, LLP

(57) ABSTRACT

A method for measuring the flow rate of a fluid flowing in a conduit includes separating the fluid into two portions then flowing into two branches (20, 22). Both portions are then recombined in an outlet manifold (14). A difference is created between the temperature of the fluid in one of the two branches (20, 22) and the temperature of the fluid in the other branch, and the passage section for the fluid in each of both branches is modulated while maintaining the total passage section constant for the fluid in both branches so that the temperature of the fluid in the outlet manifold (14) varies in a modulated way. The temperature changes of the fluid in the outlet manifold (14) are detected versus time, and the flow rate of the fluid in the conduit is determined from the detection of temperature versus time.

19 Claims, 1 Drawing Sheet

METHOD AND DEVICE FOR MEASURING THE FLOW RATE OF A FLUID

RELATED APPLICATIONS

This application is related to and claims the benefit of priority from French Patent Application No. 04 507 11, Filed on Apr. 8, 2004, the entirety of which is incorporated herein by reference.

FIELD OF THE INVENTION

The object of the present invention is a method for measuring the flow rate of fluid flowing in a conduit, as well as a flowmeter allowing such a measurement to be performed. The fluid is notably a liquid.

BACKGROUND

Several types of flowmeters exist but most of them are expensive, notably if it is desired to measure low flow rates and in a relatively extensive range of flow rates. For example, flowmeters with calibrated ports may be mentioned, the fluid flowing through a port and the pressure difference between the upstream and downstream flow from the port is measured. However, when the fluid is loaded with solid particles, the port may get clogged up or be damaged thereby changing its dimension which distorts the measurement. Flowmeters operating according to Coriolis forces are also known: the fluid flows in a U-shaped tube which is set into oscillation. The change in the oscillation frequency characterizes the mass of the fluid which passes through the tube and therefore the flow rate of the fluid. Ultrasonic flowmeters also exist which operate with the Doppler effect. However, these types of apparatuses are poorly adapted to the measurement of low flow rates.

All these flowmeters have the drawback of being expensive, each costing between 15,000 and 20,000 €.

Another technology for measuring the flow rate of a fluid consists of locally "marking" the fluid with a sudden change in temperature, by means of a heat source such as for example a heating resistor, and measuring the elapsed time for the thermally marked fluid to travel a certain distance. This distance may either be the distance separating the heat source from a detector placed downstream from this heat source, or the distance separating two detectors located downstream from the heat source. This technique is described in European Patent Application No. 0,289,361, for example. A heating unit encircles a tube in which a liquid flows, the flow rate of which is intended to be measured. The heating unit is periodically powered for brief periods so as to only heat a small amount of liquid, whenever it is powered.

The temperature of the fluid is raised, thereby thermally marking the small amount of liquid. Two infrared radiation detectors, located downstream from the heating unit and spaced apart by a known distance, detect the passage of the heated liquid. A clock connected to these detectors measures the time taken by the heated liquid to travel the distance separating both detectors. The flow velocity of the liquid may therefore be calculated and then the flow rate may be determined. It is noted that the method described in this patent application requires two detectors.

Concerning the thermal marking as described in the prior art, a heat source should, first of all, be available, capable of very rapidly and locally raising the temperature of a small portion of fluid so that the temperature gradient may easily be detected. As an example, raising the temperature of a cubic centimeter of water by one Celsius degree requires 4.2 Watt.s. If is desired to raise the temperature of 50 to 500 cc of water by one to three degrees C., a pulsed mode power of 3.5 to 105 Watt/s needs to be available. This may be achieved by an infrared laser or by microwaves, but with a high cost. Moreover, it may be difficult to control the power of a microwave generator.

Good stability of the boundary separating the areas with different temperatures is also needed for effective thermal marking. Turbulences of the fluid should therefore be avoided and for this purpose, the distance separating both detectors and the distance separating the heat source from the detector should be short.

OBJECTS AND SUMMARY

The object of the present invention is a method for measuring the flow rate and a flowmeter which does not have the drawbacks of the prior art. The flowmeter is notably very inexpensive as compared with existing apparatuses, while allowing measurements in a wide range of flow rates, including relatively low flow rates. The flow rate range is typically from 0 to 500 cc/min. Only one detector is used, so that the cost of the flowmeter may be lowered and the adverse effect of turbulences may be minimized by placing it in a suitably selected location (this is more complicated when two detectors are used).

More specifically, the invention relates to a method for measuring the flow rate of a fluid flowing in a conduit characterized in that:

the fluid is separated into two portions then flowing into two branches, both of said portions are then recombined in an outlet manifold, a difference is created between the temperature of the fluid in one of the two branches and the temperature of the fluid in the other branch, the passage section for the fluid in each of said two branches is modulated while maintaining the total passage section constant for the fluid in both of said branches so that the temperature of the fluid in said output manifold changes in a modulated way, the temperature changes of said fluid in said output manifold are detected versus time, and the flow rate of said fluid in said conduit is determined from said temperature detection versus time.

The invention also relates to a device for measuring the flow rate of a fluid in a conduit characterized in that it includes:

an inlet manifold and an outlet manifold for the fluid and two conduit branches connected between said manifolds, said manifolds being connectible onto said conduit, means for creating a difference between the temperature of the fluid flowing in one of said branches and the temperature of the fluid flowing in the other branch, means for alternately varying the passage section of each of said branches, while maintaining the total passage section constant for the fluid in said branches, and means for detecting versus time, the temperature changes of the fluid in said outlet manifold.

The temperature difference involves changing the temperature of the fluid in one of said branches. For example, the temperature may be increased by means of a simple heating resistor.

According to a preferred embodiment, the temperature of the fluid is raised in one of the two branches and the temperature of the fluid in the other branch is reduced, simultaneously, preferably by means of a Peltier effect unit.

Advantageously, the changes in temperature in both branches are substantially equal, but of opposite direction, so that the heat balance is neutral, which corresponds to substantially maintaining the same temperature of the fluid before the separation into two portions and after recombination (average temperature) in the outlet manifold.

According to an advantageous embodiment, detection of the temperature changes of the fluid also takes into account the velocity of the fluid passing into said outlet manifold. For this, an infrared radiation motion detector is used.

According to another embodiment, each of both conduit branches includes a deformable flexible portion, the passage section of which may be modulated by compression. An oscillating unit is placed opposite the flexible portions and by moving, it is able to alternately compress the flexible portions while maintaining the total passage section constant for the fluid in the conduit branches. Displacement of the oscillating unit may be effected by means of an electromagnet.

The oscillating unit may either be located between the flexible portions or surround them. In the latter case, the oscillating unit may assume the shape of a fork with two teeth, the internal walls of the teeth will alternately compress the flexible walls.

BRIEF DESCRIPTION OF THE DRAWINGS

Other advantages and features of the invention will become apparent during the following description of several embodiments given as non-limiting examples, with reference to the appended drawings and wherein.

DETAILED DESCRIPTION

Figure 1A:
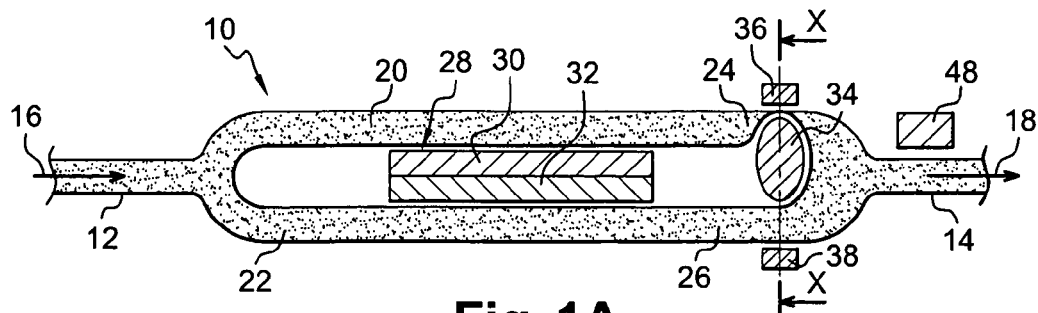
FIGS. 1A and 1B schematically illustrate an embodiment of the invention.
Figure 1B:
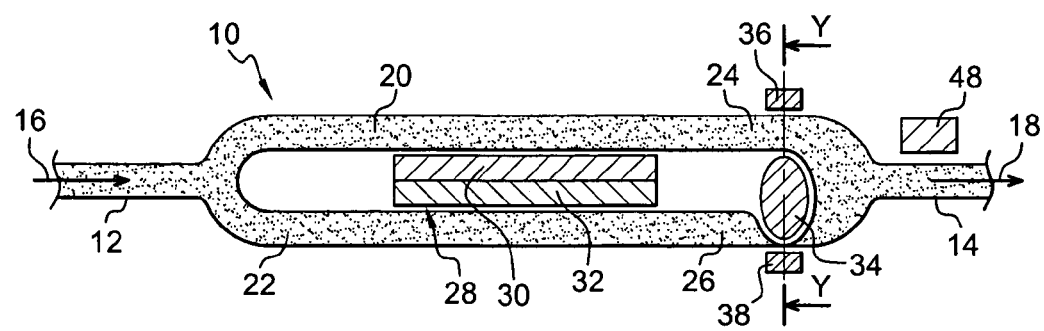

In FIGS. 1A and 1B, the flowmeter 10 consists of an inlet manifold 12 and an outlet manifold 14. These manifolds are adapted so as to be connected to a conduit (not shown) in which the fluid flows, the flow rate of which is intended to be measured. Arrows 16 and 18 show the direction of flow of the fluid. Two conduit branches 20 and 22 are connected in parallel between these inlet and outlet manifolds. Each of them includes at least a flexible portion 24 or 26 which may be deformed by compression and resume its initial shape when the compression is removed. Alternately, the conduit branches 20 and 22 are entirely flexible. The flexible portions or the entire conduit branches may be made in a plastic material such as neoprene. The materials usually used for flexible pipes of peristaltic pumps are suitable.

According to the invention, a temperature difference of the fluid present in both branches 20 and 22 is established. For example, a heating resistor may be wound onto a portion of branch 20 or 22. However it is more advantageous to act on both branches simultaneously. Thus, in FIG. 1, a Peltier effect unit 28 consisting of a hot portion 30 and a cold portion 32 when it is operating, is placed opposite the conduit branches 20 and 22. The hot portion 30 of the Peltier effect unit therefore heats the fluid flowing through branch 20 and at the same time, the cold portion 32 cools the fluid passing into branch 22. The changes in temperature of the fluid between the hot portion and the cold portion are preferably equal but of opposite direction. So, the heat balance for the fluid is neutral. The Peltier Effect unit may for example be selected from numerous models marketed by the German company Quick-Ohm Küpper & Co according to the characteristics of the flowmeter, of the fluid, and of the desired temperature difference between both branches 20 and 22. Heating and cooling of the fluid is therefore performed continuously and not in a pulsed manner. The temperature difference of the fluid between both branches 20 and 22 may be relatively small of the order of one degree Celsius or more.

The flexible portions 24 and 26 of branches 20 and 22 are alternately compressed so as to reduce or even completely close the passage section for the fluid in the conduit branches, while maintaining the same fluid flow rate in the outlet manifold 14 as in the inlet manifold 12. In other words, the total passage section for the fluid in the conduit branches is kept substantially constant. Advantageously, this total passage section is substantially equal to the passage section of manifolds 12 and 14. This alternate compression is achieved by means of an oscillating unit 32 placed opposite the flexible portions 24 and 26 and capable, by its movement, of alternately compressing the flexible portions while maintaining the total passage section constant for the fluid in the branches. Stops 36 and 38 enable the flexible portions 24 and 26 to be held firmly between the oscillating unit 34 and these stops.

Figure 2:
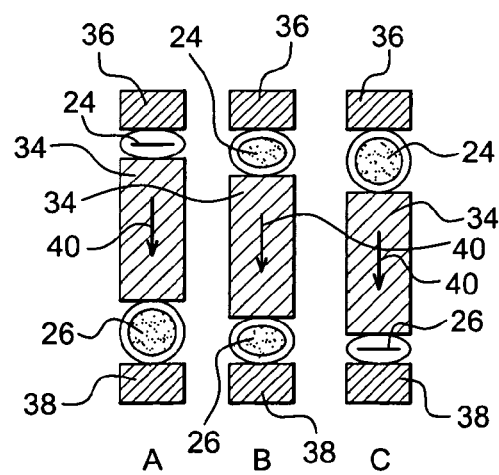
FIGS. 2A, 2B and 2C illustrate the operation of the embodiment of FIGS. 1.

FIGS. 2A and 2C schematically show sectional views along XX and along YY of the embodiment shown in FIGS. 1A and 1B, respectively. In FIG. 2A, the flexible portion 24 is completely closed so that no fluid flows in branch 20. On the other hand, the flexible portion 26 is not compressed and therefore the fluid freely flows in the branch 22. The oscillating unit 34 then moves in the direction of the arrow 40, which gradually decompresses the flexible portion 24 and gradually compresses the flexible portion 26. FIG. 2B shows an intermediate position of the oscillating unit 34, for which both portions 24 and 26 are partly compressed. As it continues to move in the direction of the arrow 40, the oscillating unit reaches an extreme position (FIG. 2C) for which portion 24 is no longer compressed and portion 26 is completely compressed. The oscillating unit which performs a reciprocating movement, is then displaced in the opposite direction of the arrow 40 in order to decompress portion 26 and compress portion 24, and so forth. During the displacement of the oscillating unit 34, the total passage section formed by the sum of the passage sections of portions 24 and 26 is substantially maintained. So, there is practically no change in the flow rate of the fluid.

The oscillating unit 34 may be an inertial mass set into motion by an electromagnet or formed by the mobile frame of an electromagnet. The reciprocating movement of the oscillating unit may also be obtained by means of a rotary motor and conventional means for transforming a rotary movement into a reciprocating movement.

Figure 3:
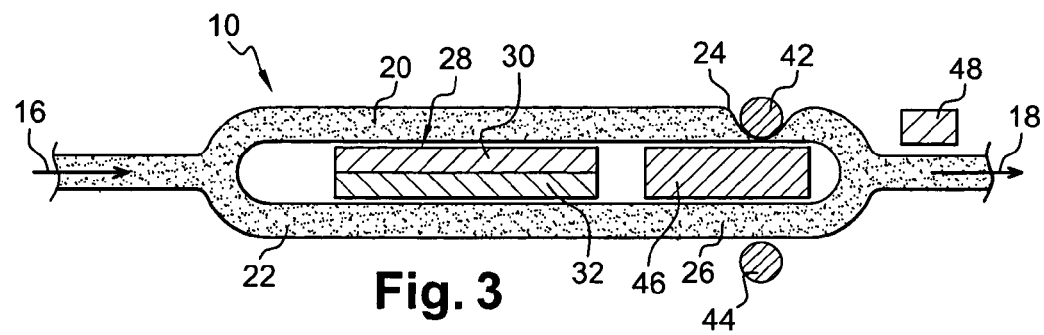
FIG. 3 schematically shows another embodiment.

FIG. 3 illustrates another embodiment of the invention which differs from the embodiment of FIG. 1 by means for alternately varying the passage section of each of said branches. Common items between FIG. 1 and FIG. 3 bear the same reference numbers. The oscillating unit mainly consists of two teeth 42 and 44 of a fork (such as both rods of a U-shaped tuning fork) which with their internal walls are in contact with the flexible portions 24 and 26. Teeth 24 and 26 move integrally with each other, by performing a reciprocating movement identical with that of inertial mass 34. The stops 36 and 38 of FIG. 1 are replaced with a stiff wall 46 forming a stop for teeth 42 and 44. By their movement, these teeth 42 and 44 alternately compress the flexible walls 24 and 16 against the wall 46, in the same way as the oscillating unit of FIG. 1. The relevance of this embodiment lies in the distance between both branches 20 and 22, which may be reduced, thereby reducing perturbations of the fluid during its displacement. In this respect, it may be advantageous to place the Peltier effect unit 28 no longer between branches 20 and 22, but on the outside, while keeping the hot portion 32 directly close to (or in contact with) the branch 20 and the cold portion 32 directly close to (or in contact with) the branch 22.

The temperature of the fluid in the outlet manifold 14 is detected by any suitable means, generally a detector of changes in temperature. However, this detector is advantageously replaced with an infrared radiation motion detector 48. This detector is a differential sensor which records temperature changes of the fluid in motion. It consists of two small sensors, placed side by side in a same casing, which record the movement of an infrared source. This type of detector is generally used for detecting the presence of a person or of an animal moving in premises under surveillance. The detector delivers a differential signal which depends on the temperature change of the fluid and on the velocity of the fluid passing in front of the detector (therefore the flow rate). The detector may for example be the detector of the RE200B type marketed by the US company, Glolab Corporation of Wappingers Falls, N.Y. 12590.

Figure 4:
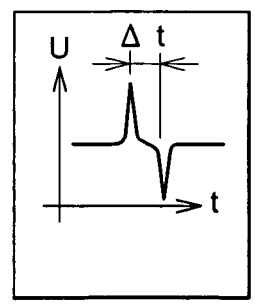
FIG. 4 shows the shape of the signal delivered by the infrared radiation motion detector.

FIG. 4 illustrates the shape of the signal, the amplitude U of the signal versus time t. The amplitude U depends on the change in temperature and on the flow rate. The faster the change in temperature, the larger is the amplitude. The distance (delta t) between both peaks is representative of the flow rate of the fluid. The flowmeter therefore comprises an electronic circuit (not shown) with a clock for processing the signals. To obtain the value of the flow rate, it is sufficient to calibrate the flowmeter beforehand with known volumes of fluid and to measure the passage times through the apparatus. This calibration operation is well known to one skilled in the art.

During operation, the fluid penetrates through the inlet manifold 16, connected beforehand to a conduit into which the fluid flows. The fluid is then separated into two portions, passing through branches 20 and 22. It is heated in branch 20 and cooled in branch 22. The oscillating unit 34 or the teeth 42 and 44, alternately modulate the flow rate in the branches 20 and 22, while maintaining the total flow rate constant. As a result, there is a change in the temperature of the fluid passing in front of the detector 48. The fluid is therefore thermally "marked" and the passage of this mark is sensed by the detector 48.

Generally, a temperature difference of at least one degree C. between the temperatures of the fluid in the branches 20 and 22 is required for ensuring a proper signal level from the detector 48. For flow rates ranging up to 500 cc/min, the period of the reciprocating movement of the oscillating unit 34 or 42/44 is between 5 and 10 seconds. However, this period depends on the characteristics of the Peltier effect unit and of the desired temperature change. With the experiment, it is possible to determine the appropriate value according to the characteristics of the fluid (notably the heat characteristics) and to the relevant range of flow rates.

The flowmeter of the invention is particularly suitable for measuring the flow rates of liquids, notably abrasive or chemically aggressive liquids. Indeed, the measurement is non intrusive, the fluid does not encounter any obstacle on its passage and there is no risk of pollution. The flowmeter may be made at a low cost with commercially available units. Moreover, a single infrared radiation detector is used. In addition to a reduction in the cost of the apparatus, the problem of errors of measurement due to the turbulences of the fluid is solved more easily as only a single location (instead of two when two detectors are used) needs to be found where turbulences do not occur or are without any actual effect on the results of the flow rate measurement.

What is claimed is:

1. A method for measuring the flow rate of a fluid flowing in a conduit said method comprising the steps of:
    separating the fluid in two portions, then flowing in two branches, both of said portions are then recombined in an outlet manifold,
    creating a difference between the temperature of the fluid in one of the branches and the temperature of the fluid in the other branch,
    modulating the passage section for the fluid in each of said two branches while maintaining the total passage section constant for the fluid in said two branches so that the temperature of the fluid in said outlet manifold varies in a modulated way,
    detecting the temperature changes of said fluid in said outlet manifold versus time, and
    determining the flow rate of said fluid in said conduit from said detection of temperature versus time.

2. The method according to claim 1, wherein the difference of temperature involves varying the temperature of the fluid in one of said branches.

3. The method according to claim 2, wherein the temperature of the fluid is raised in one of the two branches and the temperature of the fluid is reduced in the other branch, simultaneously.

4. The method according to claim 3, wherein the temperature changes in both branches are substantially equal, but of opposite direction, so that the heat balance is neutral, which corresponds to substantially maintaining the same temperature of the fluid before said separation into two portions and after recombination in said outlet manifold.

5. The method according to claim 1, wherein the modulation period of said passage section for the fluid substantially corresponds to the time required for raising the temperature of the fluid by at least one degree Celsius.

6. The method according to claim 1, wherein the detection of the temperature changes of the fluid also takes into account the velocity of the fluid passing into said outlet manifold.

7. The method according to claim 1 wherein said fluid is a liquid.

8. A device for measuring the flow rate of a fluid in a conduit comprising:
    an inlet manifold and an outlet manifold for the fluid, and two conduit branches, connected between said manifolds, said manifolds being connectible onto said conduit,
    means for creating a difference between the temperature of the fluid flowing in one of said branches and the temperature of the fluid flowing in the other branch,
    means for alternately varying the passage section of each of said branches, while maintaining the total passage section constant for the fluid in said branches, and
    means for detecting temperature versus time, the changes in temperature of the fluid in said outlet manifold.

9. The device according to claim 8, wherein said means for creating a temperature difference include at least one heating unit surrounding one of said two branches.

10. The device according to claim 9, wherein the rise in temperature substantially corresponds in the opposite direction to the reduction in temperature so that the heat balance is neutral.

11. The device according to claim 8, wherein said means for creating a temperature difference include a Peltier effect unit, a portion of said unit raising the temperature of the fluid of one of said branches and another portion of said unit lowering the temperature of the fluid in the other branch.

12. The device according to claim 8, wherein each of said two conduit branches includes a deformable flexible portion, the passage section of which may be modulated by compression.

13. The device according to claim 12, wherein said means for alternately varying the passage section of each of said branches include an oscillating unit placed opposite to said flexible portions of said branches and capable by its movement, of alternately compressing said flexible portions while maintaining the total passage section constant for the fluid in said branches.

14. The device according to claim 13, wherein said means further include an electromagnet moving said oscillating unit.

15. The device according to claim 13, wherein said oscillating unit is an inertial mass placed between said flexible portions.

16. The device according to claim 13, wherein said oscillating unit includes a portion in the shape of a fork with two teeth surrounding said flexible portions, the internal wall of each tooth causing by compression, modulation of the section of the flexible portion.

17. The device according to claim 8, wherein said means for detecting temperature changes of the fluid include an infrared radiation detector.

18. The device according to claim 17, wherein said detector is an infrared radiation motion detector.

19. The device according to claim 8 wherein said fluid is a liquid.

* * * * *